United States Patent
D'Silva

(10) Patent No.: US 8,852,004 B2
(45) Date of Patent: Oct. 7, 2014

(54) DOWNHOLE TORQUE LIMITING ASSEMBLY FOR DRILL STRING

(71) Applicant: Halliburton Energy Services, Inc., Houston, TX (US)

(72) Inventor: Alben D'Silva, Edmonton (CA)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/003,109

(22) PCT Filed: Dec. 19, 2012

(86) PCT No.: PCT/US2012/070558
§ 371 (c)(1),
(2), (4) Date: Sep. 4, 2013

(87) PCT Pub. No.: WO2014/098832
PCT Pub. Date: Jun. 26, 2014

(65) Prior Publication Data
US 2014/0166370 A1    Jun. 19, 2014

(51) Int. Cl.
| F16D 7/04 | (2006.01) |
| E21B 17/06 | (2006.01) |
| E21B 17/04 | (2006.01) |
| F16D 7/10 | (2006.01) |
| F16D 7/00 | (2006.01) |
| E21B 4/00 | (2006.01) |

(52) U.S. Cl.
CPC .................. *E21B 4/006* (2013.01); *E21B 17/06* (2013.01); *E21B 17/04* (2013.01); *F16D 7/10* (2013.01); *F16D 7/00* (2013.01)
USPC ............................................. 464/38; 175/101

(58) Field of Classification Search
USPC .................. 464/41, 35–39; 175/101, 320, 323
See application file for complete search history.

(56) References Cited

U.S. PATENT DOCUMENTS

| 2,978,047 A | 4/1961 | De Vaan |
| 4,043,437 A * | 8/1977 | Taylor .......................... 464/37 X |

(Continued)

FOREIGN PATENT DOCUMENTS

| FR | 446230 | * 11/1912 | ..................... 464/37 |
| GB | 753947 | * 8/1956 | ..................... 464/37 |

(Continued)

OTHER PUBLICATIONS

Authorized officer Adri Schouten, International Search Report and Written Opinion in International Application No. PCT/US2012/070558, mailed Aug. 14, 2013, 10 pages.

*Primary Examiner* — Gregory Binda
(74) *Attorney, Agent, or Firm* — Anthony Iannitelli; Fish & Richardson P.C.

(57) ABSTRACT

A method includes a rotary torque limiting assembly including a rotary input member having an internal cavity having sprag receptacles. A rotary output member is disposed within the internal cavity, the secondary rotary member having radial protrusions and recesses. Radial ratchet members are disposed radially between the input member and the output member, each ratchet member having a radially inner surface, and a radially outward surface that includes at least one radially protruding sprag. Bearings are disposed radially between the ratchet members and the output member. A retaining assembly is adapted to provide a compliant force to maintain contact among the ratchet members, bearings, and second rotary member. Each bearing is partly retained between one of the ratchet members and the second rotary member, and each sprag is partly retained within a corresponding sprag receptacle.

20 Claims, 5 Drawing Sheets

(56) References Cited

U.S. PATENT DOCUMENTS

| | | |
|---|---|---|
| 4,572,041 A | 2/1986 | Rissmann |
| 4,878,566 A * | 11/1989 | Hamada et al. |
| 5,323,852 A | 6/1994 | Cornette et al. |
| 6,182,774 B1 | 2/2001 | Tibbits |
| 6,594,881 B2 | 7/2003 | Tibbitts |
| 7,377,337 B2 | 5/2008 | Swietlik et al. |
| 7,703,550 B2 | 4/2010 | Nevlud et al. |
| 7,735,581 B2 | 6/2010 | Beylotte et al. |
| 2011/0073372 A1 | 3/2011 | Prill et al. |
| 2011/0240313 A1 | 10/2011 | Knobloch, Jr. et al. |

FOREIGN PATENT DOCUMENTS

| | | | |
|---|---|---|---|
| GB | 818024 | 8/1959 | |
| SU | 1656225 A1 * | 6/1991 | 464/37 |

* cited by examiner

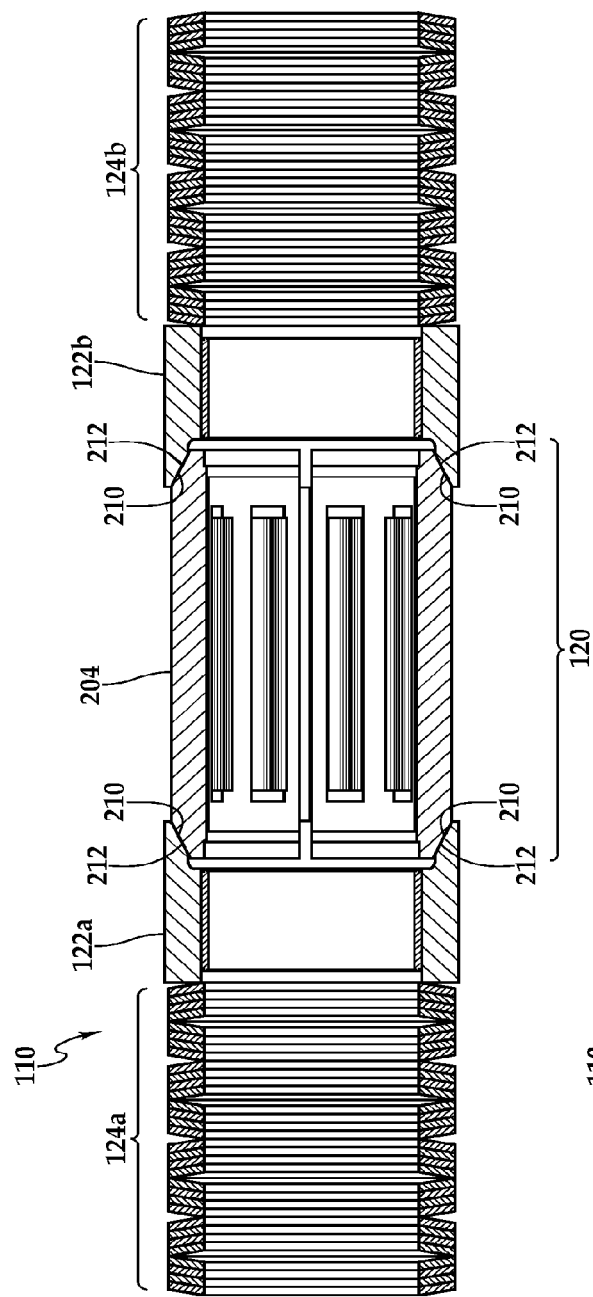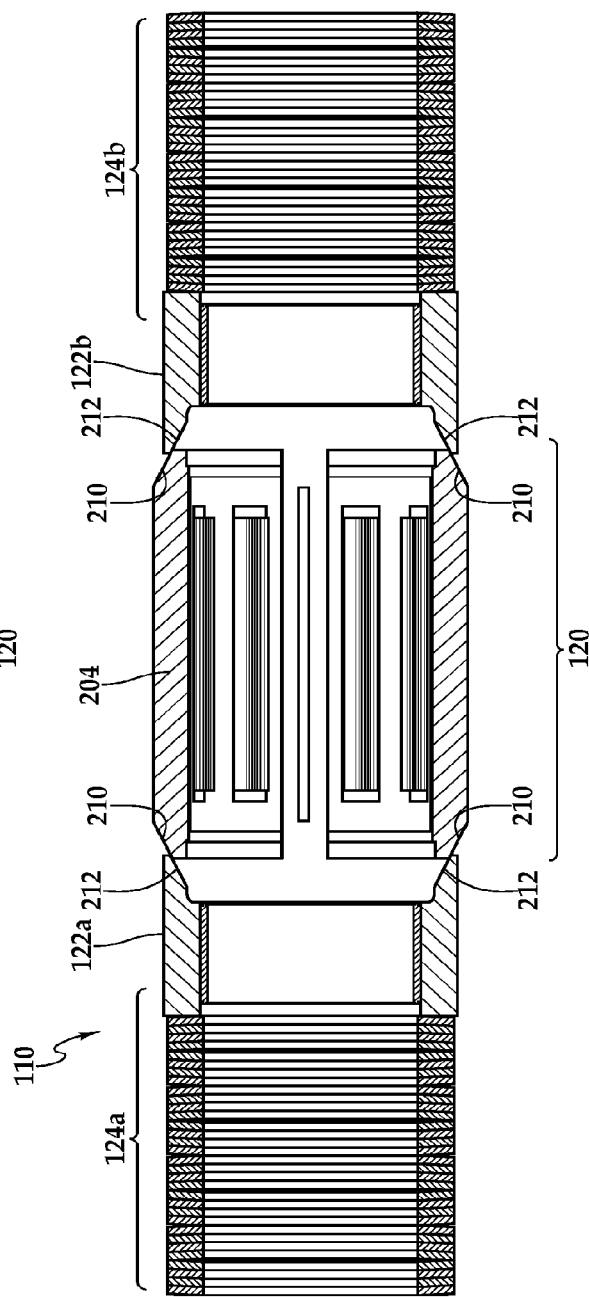

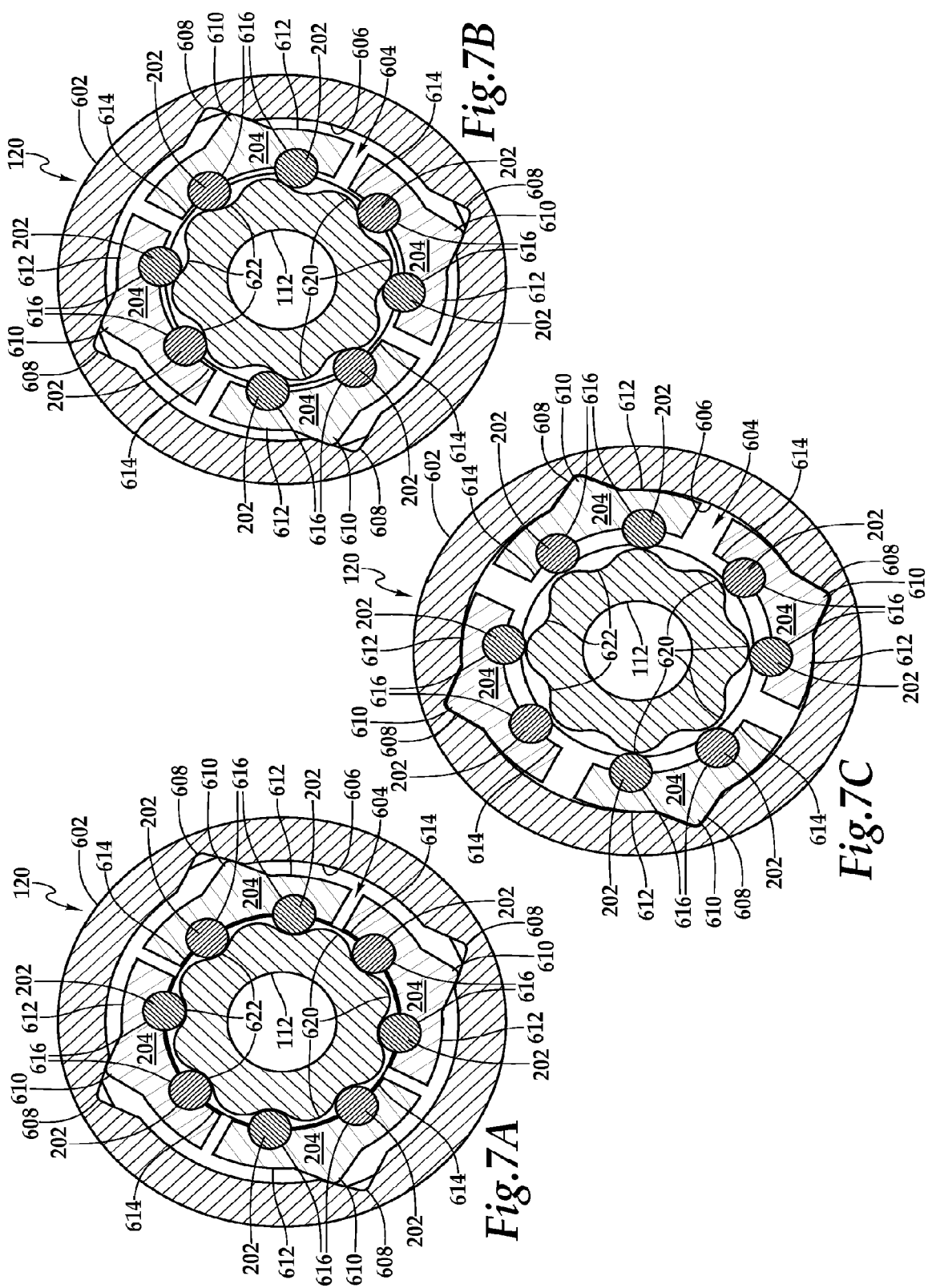

DOWNHOLE TORQUE LIMITING ASSEMBLY FOR DRILL STRING

TECHNICAL FIELD

The present disclosure relates to systems, assemblies, and methods for protecting downhole tools (referred to as a tool string) attached to a "drill string" disposed in a wellbore, where adverse conditions may be present to challenge rotational movement of the tool string in the wellbore.

BACKGROUND

In oil and gas exploration it is important to protect the structural integrity of the drill string and downhole tools connected thereto. Referring to FIG. 1, in general, a drilling rig 10 located at or above the surface 12 rotates a drill string 20 disposed in the wellbore below the surface. The drill string typically includes drill pipe 22 and drill collars 24 that are rotated and transfer torque down the borehole to a drill bit 50 or other downhole equipment (referred to generally as the "tool string") 40 attached to a distal end of the drill string. The surface equipment 14 on the drilling rig rotates the drill string 20 and the drill bit 50 as it bores into the Earth's crust to form a wellbore 60. The drill bit, however, generally encounters variances across various geological formations that may provide differing amounts of resistance to the drill. In many instances, such resistance may be unanticipated and can result in an excessive amount of torque being delivered along the drill string from the surface, possibly causing the drill string or tool string connected to the drill string to be damaged and/or break. Such breakage results in additional work and expense needed to retrieve the section of the drill string and tool string below the break and repair the damage, in addition to the costs associated with the resulting downtime.

SUMMARY

In general, this document describes a rotary torque-limiting assembly used in conjunction with downhole drilling and or downhole completion tools. The rotary torque limiting assembly includes a rotary input member having an internal cavity having sprag receptacles. A rotary output member is disposed within the internal cavity, the secondary rotary member having radial protrusions and recesses. Radial ratchet members are disposed radially between the input member and the output member, each ratchet member having a radially inner surface, and a radially outward surface that includes at least one radially protruding sprag. Bearings are disposed radially between the ratchet members and the output member. A retaining assembly is adapted to provide a compliant force to maintain contact among the ratchet members, bearings, and second rotary member. Each bearing is at least partly retained between one of the ratchet members and the second rotary member, and each sprag is at least partly retained within a corresponding sprag receptacle.

The details of one or more implementations are set forth in the accompanying drawings and the description below.

DESCRIPTION OF DRAWINGS

FIG. 5 is a cross-sectional view of an example of a downhole torque limiting device.

FIG. 6 is a cross-sectional view of an example of a downhole torque limiting device in a torque limiting mode.

FIGS. 7A-7D are cross-sectional views of an example of a downhole torque limiting device.

DETAILED DESCRIPTION

Figure 1:
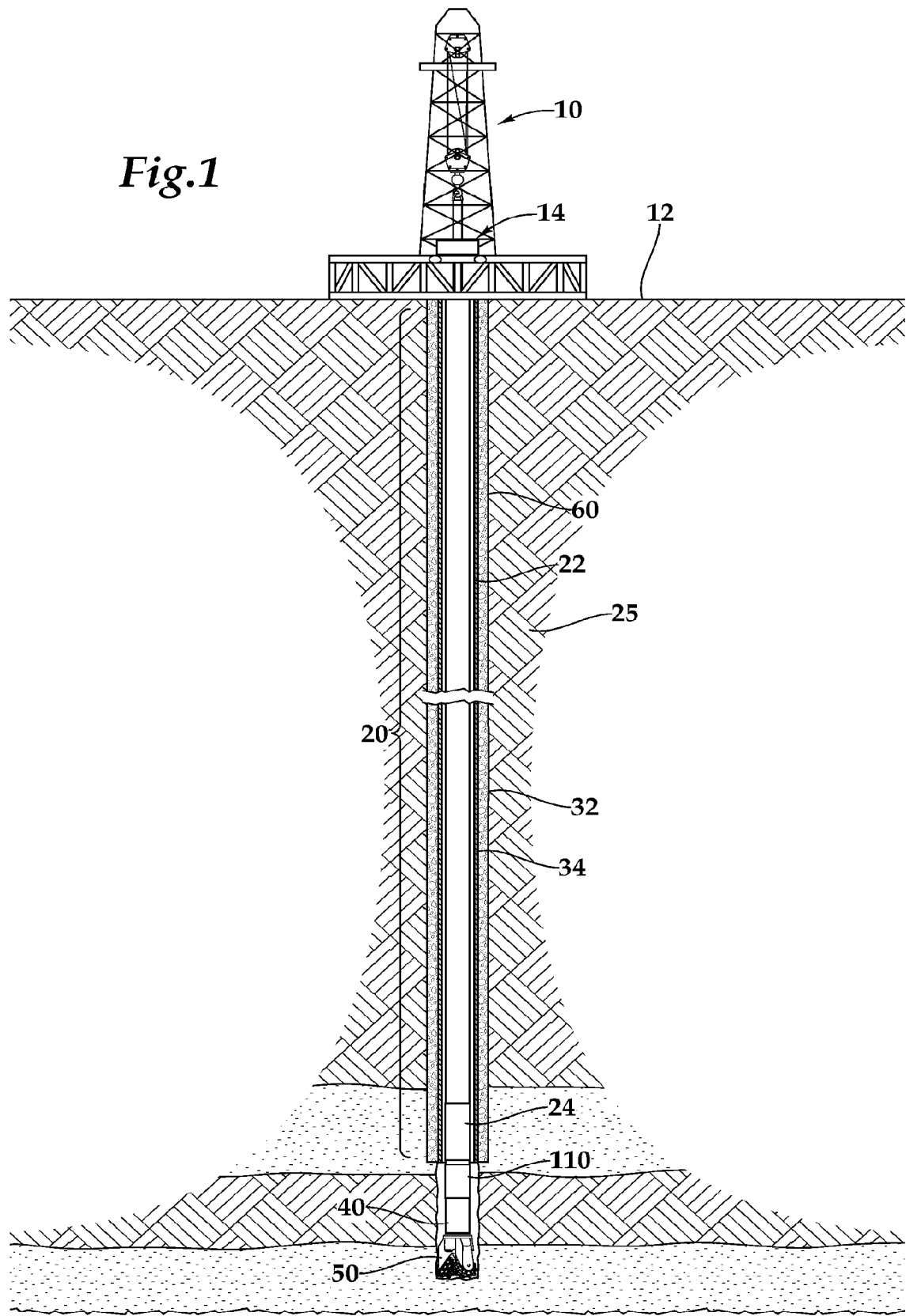
FIG. 1 is a schematic illustration of a drilling rig and downhole equipment disposed in a wellbore.

Referring to FIG. 1, in general, a drilling rig 10 located at or above the surface 12 rotates a drill string 20 disposed in a wellbore 60 below the surface. The drill string 20 typically includes drill pipe 22 and drill collars 24 that are rotated and transfer torque down the borehole to a drill bit 50 or other downhole equipment (referred to generally as the "tool string") 40 attached to a distal end of the drill string 20. The surface equipment 14 on the drilling rig rotates the drill string 20 and the drill bit 50 as it bores into the Earth's crust to form a wellbore 60. The wellbore 60 is reinforced by a casing 34 and a cement sheath 32 in the annulus between the casing 34 and the borehole. The drill bit 50, however, generally encounters variances across various geological formations 25 that may provide differing amounts of resistance to the drill. In many instances, such resistance may be unanticipated and can result in an excessive amount of torque being delivered along the drill string 20 from the surface 12. In other situations in a deviated wellbore the drill string 20 or tool string 40 may become stuck in the wellbore 60 and cause excessive torque in the drill string 20 or tool string. In other situations the borehole walls may slough off formation material that packs around the drill bit 50, tool string 40 or drill string 20 and cause one or more of these elements to become stuck and result in excessive torque in the drill string 20.

In some implementations, the tool string 40 can be a drilling, completions or re-entry tool string. The drilling tool string includes tool elements such as rotary steerable tool systems, mud motors, under reamers, and/or measurement while drilling (MWD)/FEWD devices. In order to avoid overtorqueing the drill string 20 and/or elements of the tool string 40 a torque limiting device 110 may be inserted between the drill string 20 and the tool string 40.

When the torsional forces between the drill string 20 and tool string 40 across the torque limiting device 110 exceed a predetermined amount, the device 110 will rotationally decouple the two sections until the forces drop back below the predetermined amount.

Figure 2:
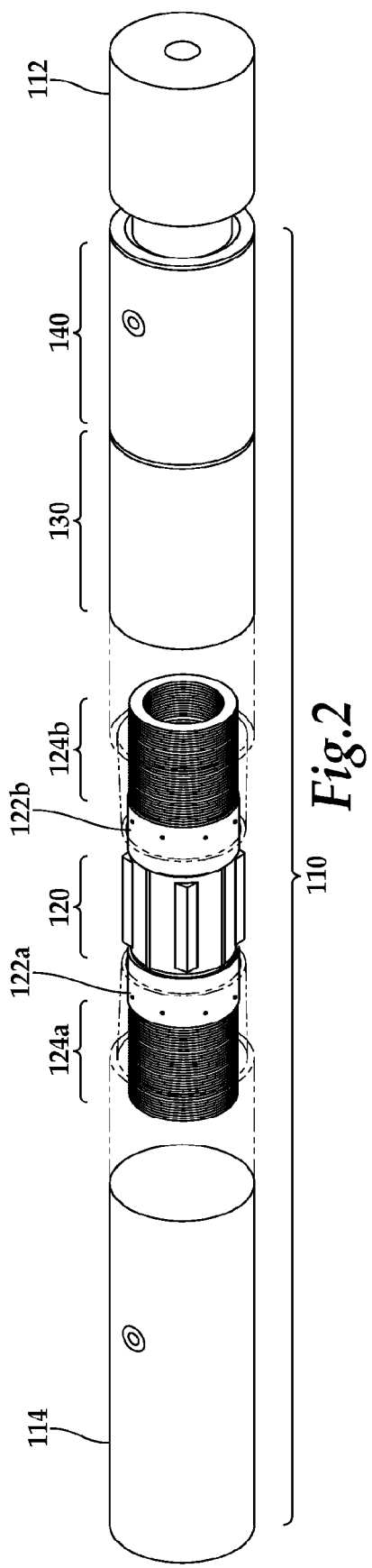
FIG. 2 is a perspective view of the lower portion of a drill string section that includes an example of a downhole torque limiting device.

FIG. 2 is a perspective view of the downhole torque limiting device 110. Referring to FIGS. 1 and 2, in some implementations, the torque limiting device 110 limits the amount of torque that is transmitted from a rotary input member (e.g., external housing 114) connected to the drill string 20 (see FIG. 1) and receiving rotational torque from the drill string 20, to a rotary output member (e.g., drive shaft 112). In some implementations, the torque limiting device can be used to limit the amount of torque that is developed along the tool string section 40 (see FIG. 1) as the external housing 114 is rotated to drive a drill bit 50 (see FIG. 1) directly or indirectly coupled to the drive shaft 112.

The torque limiting device 110 includes a radial ratchet assembly 120, a spring support assembly 122a disposed adjacent to an uphole axial end of the radial ratchet assembly 120, and a spring support assembly 122b disposed adjacent to a downhole axial end of the radial ratchet assembly 120. A spring section 124a axially provides axial compression between the spring support assembly 122a and the radial ratchet assembly. A spring section 124b axially provides axial compression between the spring support assembly 122b and the radial ratchet assembly.

A bearing assembly 130 is provided to constrain the relative motion of the drive shaft 112 and rotationally decouple the drive shaft 112 from an outer housing (not shown) of the torque limiting device 110. A sealing housing 140 is provided to or at least minimizes the intrusion of contaminants (e.g., drilling debris, particulate suspensions, dirt, mud, sand) from entering the interior components of the torque limiting device 110.

Figure 3:
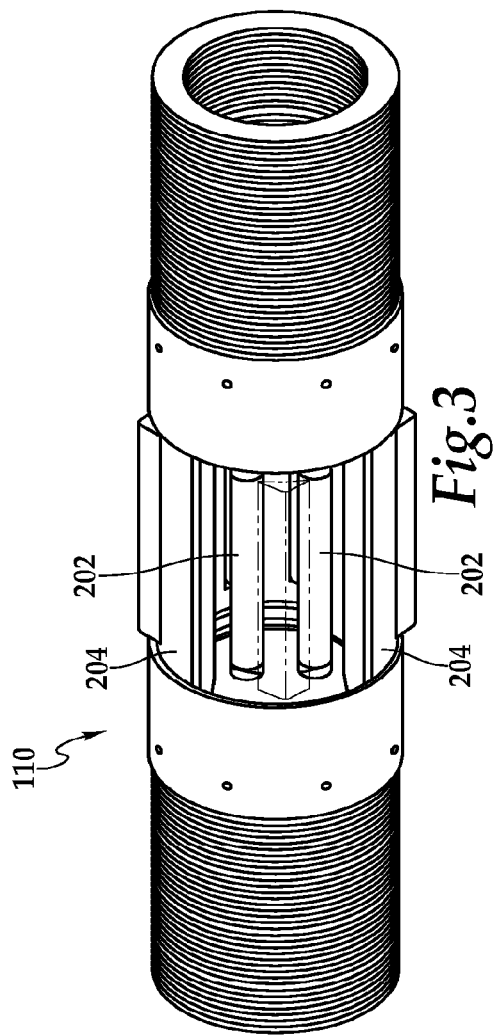
FIG. 3 is a partial perspective view of an example of the downhole torque limiting device of FIG. 2.

FIG. 3 is a partial perspective view of the example of the downhole torque limiting device 110. The radial ratchet assembly 120 includes a collection of roller bearings 202 and a collection of radial ratchet members 204. In the view of FIG. 3, the radial ratchet assembly 120 of FIG. 2 is shown with one of the radial ratchet members 204 removed to provide a view of the roller bearings 202.

Figure 4:
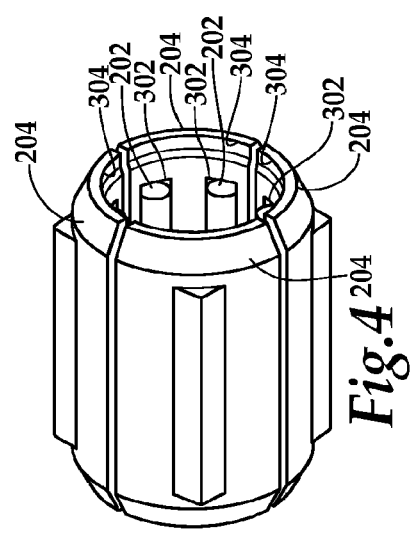
FIG. 4 is a perspective view of examples of ratchet members.

FIG. 4 is a perspective view of examples of the radial ratchet members 204 and roller bearings 202. As further detailed below, the collection of roller bearings 202 are at least partially disposed within a collection of corresponding recesses 302 formed within a radially interior surface 304 of each of the radial ratchet members 204.

FIG. 5 is a cross-sectional view of an example of the downhole torque limiting device 110. As illustrated in FIG. 5, the collection of radial ratchet members 204 is constrained radially by the spring support assemblies 122a and 122b. The constraint is compliant, in which an angular face 210 of each radial ratchet member 204 is in sliding contact with a corresponding angular face 212 of the spring support assemblies 122a and 122b. These components will be discussed in additional detail in the descriptions of FIGS. 7A-7C.

FIG. 6 is a cross-sectional view of an example of the downhole torque limiting device 110 in a torque limiting mode. In operation, when the torque forces developed across the downhole torque limiting device 110 are substantially zero, the radial ratchet members 204 will be in a generally compressed configuration such as that shown by the example of FIG. 5. In operation, as the amount of torque developed across the downhole torque limiting device 110 increases, the radial ratchet members 204 are urged radially outward, as depicted in the example of FIG. 6. This process of radially outward expansion is discussed further in the descriptions of FIGS. 7A-7C.

The spring sections 124a-124b compress the spring support members 122a-122b axially toward each other. Such compression compliantly urges the radial ratchet members 204 radially inward. In use, torque forces developed along the downhole torque limiting device 110 act to urge the radial ratchet members 204 radially outward. This outward expansion causes the angular faces 210 to impart an axial force against the angular faces 212, urging the spring support members 122a-122b axially away from the radial ratchet assembly 120, which in turn compresses the spring sections 124a-124b.

In some embodiments, the spring sections 124a-124b can each include a collection of one or more frusto-conical springs (e.g., coned-disc springs, conical spring washers, disc springs, cupped spring washers, Belleville springs, Belleville washers). In some implementations, the springs can be helical compression springs, such as die springs. In some implementations, multiple springs may be stacked to modify the spring constant provided by the spring sections 124a-124b. In some implementations, multiple springs may be stacked to modify the amount of deflection provided by the spring sections 124a-124b. For example, stacking springs in the same direction can add the spring constant in parallel, creating a stiffer joint with substantially the same deflection. In another example, stacking springs in an alternating direction can perform substantially the same functions as adding springs in series, resulting in a lower spring constant and greater deflection. In some implementations, mixing and/or matching spring directions can provide a predetermined spring constant and deflection capacity. In some implementations, by altering the deflection and/or spring constant of the spring sections 124a-124b, the amount of torque required to cause the downhole torque limiting device 110 to enter a torque limiting mode can be likewise altered.

FIGS. 7A-7C are cross-sectional views of an example of the downhole torque limiting device 110, taken across an axially central point of the radial ratchet assembly 120. Referring to FIG. 7A, the downhole torque limiting device 110 includes an outer housing 602 (corresponding to the housing 114 of FIG. 2). The outer housing 602 includes an internal cavity 604. The internal cavity 604 includes an internal surface 606, which includes a collection of receptacles 608.

The radial ratchet members 204 include one or more projections ("sprags") 610 that extend radially outward from a radially outward surface 612. In use, the sprags 610 are at least partly retained within the receptacles 608 (hereinafter referred to as "sprag receptacles"). It will be understood that the sprag 610 is illustrated as triangular shaped. However it will be understood that other geometric configurations of the projection and a matting receptacle may be used and that "sprag" and sprag shape is not limited to a triangular configuration As discussed previously, the radial ratchet members 204 also include a radially inner surface 614. The radially inner surface 614 includes at least one semicircular recess 616. Each semicircular recess 616 is formed to partly retain a corresponding one of the collection of roller bearings 202. The collection of roller bearings 202 is substantially held in rolling contact with the drive shaft 112.

The drive shaft 112 includes a collection of radial protrusions 620 and radial recesses 622. Under the compression provided by the spring sections 124a-124b (e.g., FIGS. 3, 4, 5, and 6), the radial ratchet members 204 are urged radially inward. As such, under conditions in which the downhole torque limiting device 110 is experiencing substantially zero torque, the roller bearings 202 will be rolled to substantially the bases of the radial recesses 622 (e.g., allowing the spring sections 124a-124b to rest at a point of relatively low potential energy).

FIG. 7B illustrates an example of the radial ratchet assembly 120 with some torque (e.g., an amount of torque less than a predetermined torque threshold) being developed between the drive shaft 112 and the outer housing 602. In use, the outer housing 602 (also referred to as 114 in FIG. 2) is rotated. This rotational force is transferred to the roller bearings 202, to the radial ratchet members 204, and to the drive shaft 112.

As torque forces between the outer housing 602 and the drive shaft 112 increase, the roller bearings 202 are partly urged out of the radial recesses 622 toward neighboring radial protrusions 620. As the roller bearings 202 are urged toward the radial protrusions 620, the radial ratchet members 204 comply by extending radially outward in opposition to the compressive forces provided by the spring sections 124a-124b (not shown). As the radial ratchet members 204 extend outward, contact between the sprags 610 and the sprag receptacles 608 is substantially maintained as the sprags 610 penetrate further into the sprag receptacles 608.

In implementations in which the torque developed between the drive shaft 112 and the outer housing 602 is less than a predetermined torque threshold, rotational forces can continue to be imparted to the drive shaft 112 from the outer housing 602. In some implementations, the predetermined torque threshold can be set through selective configuration of the spring sections 124a-124b.

FIG. 7C illustrates an example of the radial ratchet assembly 120 with an excess torque (e.g., an amount of torque greater than a predetermined torque threshold) being developed between the drive shaft 112 and the outer housing 602. In use, the outer housing 602 is rotated. The operation of the radial ratchet assembly 120 substantially decouples the transfer of rotational energy to the drive shaft 112 from the outer housing 602 when torque levels are in excess of the predetermined torque threshold.

In operation, an excess torque level causes the roller bearings 202 to roll further toward the radial protrusions 620. Eventually, as depicted in FIG. 7C, the present example, the radial ratchet members 204 comply sufficiently to allow the roller bearings 202 to reach the peaks of the radial protrusions 620. In such a configuration, the rotational force of the outer housing 602 imparted to the radial ratchet members 204 is substantially unable to be transferred as rotational energy to the roller bearings 202, and as such, the drive shaft 112 becomes substantially rotationally decoupled from the outer housing 602.

In the examples discussed in the descriptions of FIGS. 1-7C, the radial ratchet assembly 120 may be bidirectionally operable, e.g., the torque limiting function of the downhole torque limiting device 110 can operate substantially the same under clockwise or counterclockwise torques. In some implementations, the radial ratchet assembly 120, the outer housing 602, and/or the drive shaft 112 may be formed to provide a torque limiting device that is unidirectional.

Figure 7D:
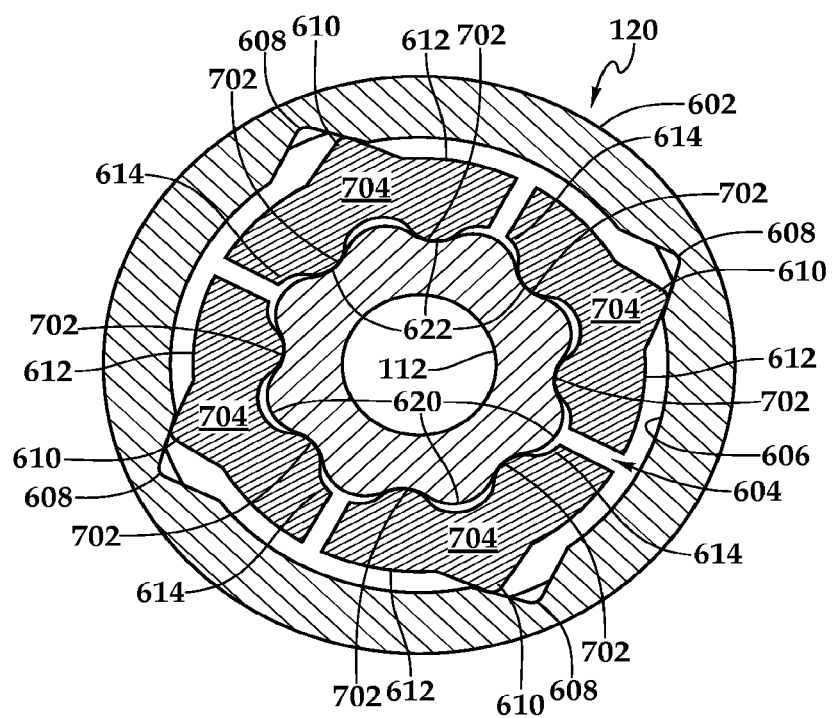

In some implementations, as illustrated in FIG. 7D, the roller bearings 202 may be replaced by sliding bearings 702. For example, one or more of the radial ratchet members 704 may include semicircular protrusions extending radially inward from the radially inner surface of the ratchet member 704. These semicircular protrusions may rest within the radial recesses 622 during low-torque conditions, and be slidably urged toward the radial protrusions 620 as torque levels increase.

In some implementations, multiple sets of radial ratchet assemblies may be used together. For example, the torque limiting assembly 110 can include two or more of the radial ratchet assemblies 120 in parallel to increase the torque capability available between the drilling rig 10 and the drill bit 50.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A rotary torque limiting assembly comprising:
   a rotary input member having an internal cavity, the internal cavity having a surface including a plurality of sprag receptacles;
   a rotary output member disposed within the internal cavity of the rotary input member, the rotary output member having a plurality of radial protrusions and radial recesses;
   a plurality of radial ratchet members disposed radially between the rotary input member and the rotary output member, each radial ratchet member having a radially inner surface, and a radially outward surface that includes at least one radially protruding sprag;
   a plurality of bearings disposed radially between the plurality of radial ratchet members and the rotary output member; and
   a retaining assembly comprising a compliant member having sufficient compliant force to maintain contact among at least one of the plurality of ratchet members, at least one of the plurality of bearings, and the rotary output member, said compliant member spaced apart longitudinally from each radially protruding sprag of each of the radial ratchet members, and wherein each sprag is at least partially disposed within a corresponding sprag receptacle.

2. The rotary torque limiting assembly of claim 1, wherein one or more of the radial ratchet members transmits rotational motion in a first rotational direction from the rotary input member to the rotary output member when an amount of torque developed across the rotary torque limiting assembly is equal to or less than a predetermined torque threshold; and
   the one or more of the radial ratchet members prevents transmission of rotational motion in the first rotational direction from the rotary input member to the rotary output member when an amount of torque developed across the rotary torque limiting assembly is greater than a predetermined torque threshold.

3. The rotary torque limiting assembly of claim 2, wherein one or more of the radial ratchet members transmits rotational motion in a second opposite rotational direction from the rotary input member to the rotary output member when an amount of torque developed across the rotary torque limiting assembly is equal to or less than a predetermined torque threshold; and
   the one or more of the radial ratchet members prevents transmission of rotational motion in the second rotational direction from the rotary input member to the rotary output member when an amount of torque developed across the rotary torque limiting assembly is greater than a predetermined torque threshold.

4. The rotary torque limiting assembly of claim 3, wherein each of the plurality of ratchet members includes an angular external surface, and wherein the retaining assembly comprises:
   a support assembly having a first face and a second face, the first face having an angular internal surface substantially parallel to the angular external surface; and
   at least one compliant member adapted to provide a compliant force between one of the input member or the output member and the second face of the support assembly, wherein the compliant member urges the angular internal surface to contact the angular external surface.

5. The rotary torque limiting assembly of claim 3, wherein the bearings comprise roller bearings and the radially inner surface includes at least one semicircular recess, and wherein the compliant force further maintains contact among the plurality of ratchet members, the plurality of roller bearings, and the rotary output member, wherein each roller bearing is partly retained between one of the radial ratchet members and the rotary output member within a corresponding one of the semicircular recesses, and wherein each sprag is partly retained within a corresponding sprag receptacle.

6. The rotary torque limiting assembly of claim 2, wherein each of the plurality of ratchet members includes an angular external surface, and wherein the retaining assembly comprises:
- a support assembly having a first face and a second face, the first face having an angular internal surface substantially parallel to the angular external surface; and
- at least one compliant member adapted to provide a compliant force between one of the input member or the output member and the second face of the support assembly, wherein the compliant member urges the angular internal surface to contact the angular external surface.

7. The rotary torque limiting assembly of claim 1, wherein each of the plurality of ratchet members includes an angular external surface, and wherein the retaining assembly comprises:
- a support assembly having a first face and a second face, the first face having an angular internal surface substantially parallel to the angular external surface; and
- at least one compliant member adapted to provide a compliant force between one of the input member or the output member and the second face of the support assembly, wherein the compliant member urges the angular internal surface to contact the angular external surface.

8. The rotary torque limiting assembly of claim 7, wherein the compliant member is a spring.

9. The rotary torque limiting assembly of claim 7, wherein the bearings are roller bearings and the radially inner surface includes at least one semicircular recess, and wherein the compliant force further maintains contact among the plurality of ratchet members, the plurality of roller bearings, and the rotary output member, wherein each roller bearing is partly retained between one of the radial ratchet members and the rotary output member within a corresponding one of the semicircular recesses, and wherein each sprag is partly retained within a corresponding sprag receptacle.

10. The rotary torque limiting assembly of claim 1, wherein the bearings comprise radial protrusions extending radially inward from the radially inner surfaces of the radial ratchet members.

11. The rotary torque limiting assembly of claim 1, wherein the bearings comprise roller bearings and the radially inner surface includes at least one semicircular recess, and wherein the compliant force further maintains contact among the plurality of ratchet members, the plurality of roller bearings, and the rotary output member, wherein each roller bearing is partly retained between one of the radial ratchet members and the rotary output member within a corresponding one of the semicircular recesses, and wherein each sprag is partly retained within a corresponding sprag receptacle.

12. A method for limiting torque in a rotary assembly comprising: providing a rotary torque limiting assembly including:
- a rotary input member having an internal cavity, the internal cavity having a surface including a plurality of sprag receptacles;
- a rotary output member disposed within the internal cavity of the rotary input member, the rotary output member having a plurality of radial protrusions and radial recesses;
- a plurality of radial ratchet members disposed radially between the rotary input member and the rotary output member, each radial ratchet member having a radially inner surface, and a radially outward surface that includes at least one radially protruding sprag;
- a plurality of bearings disposed radially between the plurality of radial ratchet members and the rotary output member; and
- a retaining assembly comprising a compliant member having sufficient compliant force to maintain contact among at least one of the plurality of ratchet members, at least one of the plurality of bearings, and the rotary output member, said compliant member spaced apart longitudinally from each radially protruding sprag of each of the radial ratchet members, and wherein each sprag is at least partially disposed within a corresponding sprag receptacle;
- rotating the rotary input member at a torque level at or below a predetermined torque threshold at or below which the plurality of bearings are urged to revolve along with the rotary output member, the revolution of the bearings urging the plurality of ratchet members to revolve along with the rotary output member, the revolution of the plurality of ratchet members urging the rotary output member to revolve along with the rotary input member; and
- rotating the rotary input member at a torque level above the predetermined torque threshold above which the plurality of bearings are urged out of the plurality of recesses and over the plurality of protrusions to decouple the rotation of the rotary input member from urging revolution of the plurality of bearings, the plurality of ratchet members, and the rotary output member.

13. The method of claim 12, wherein one or more of the radial ratchet members transmits rotational motion in a first rotational direction from the rotary input member to the rotary output member when an amount of torque developed across the rotary torque limiting assembly is equal to or less than a predetermined torque threshold; and
- the one or more of the radial ratchet members prevents transmission of rotational motion in the first rotational direction from the rotary input member to the rotary output member when an amount of torque developed across the rotary torque limiting assembly is greater than a predetermined torque threshold.

14. The method of claim 13, wherein one or more of the radial ratchet members transmits rotational motion in a second opposite rotational direction from the rotary input member to the rotary output member when an amount of torque developed across the rotary torque limiting assembly is equal to or less than a predetermined torque threshold; and
- the one or more of the radial ratchet members prevents transmission of rotational motion in the second rotational direction from the rotary input member to the rotary output member when an amount of torque developed across the rotary torque limiting assembly is greater than a predetermined torque threshold.

15. The method of claim 14, wherein each of the plurality of ratchet members includes an angular external surface, and wherein the retaining assembly comprises:
- a support assembly having a first face and a second face, the first face having an angular internal surface substantially parallel to the angular external surface; and
- at least one compliant member adapted to provide a compliant force between one of the input member or the output member and the second face of the support assembly, wherein the compliant member urges the angular internal surface to contact the angular external surface.

16. The method of claim 13, wherein each of the plurality of ratchet members includes an angular external surface, and wherein the retaining assembly comprises:

a support assembly having a first face and a second face, the first face having an angular internal surface substantially parallel to the angular external surface; and at least one compliant member adapted to provide a compliant force between one of the input member or the output member and the second face of the support assembly, wherein the compliant member urges the angular internal surface to contact the angular external surface.

17. The method of claim 12, wherein each of the plurality of ratchet members includes an angular external surface, and wherein the retaining assembly comprises:

a support assembly having a first face and a second face, the first face having an angular internal surface substantially parallel to the angular external surface; and at least one compliant member adapted to provide a compliant force between one of the input member or the output member and the second face of the support assembly, wherein the compliant member urges the angular internal surface to contact the angular external surface.

18. The method of claim 17, wherein the compliant member is a spring.

19. The method of claim 12, wherein the bearings comprise radial protrusions extending radially inward from the radially inner surfaces of the radial ratchet members.

20. The method of claim 12, wherein the bearings comprise roller bearings and the radially inner surface includes at least one semicircular recess, and wherein the compliant force further maintains contact among the plurality of ratchet members, the plurality of roller bearings, and the rotary output member, wherein each roller bearing is partly retained between one of the radial ratchet members and the rotary output member within a corresponding one of the semicircular recesses, and wherein each sprag is partly retained within a corresponding sprag receptacle.

* * * * *